United States Patent [19]
Abbe et al.

[11] 3,990,005
[45] Nov. 2, 1976

[54] CAPACITIVE THICKNESS GAUGING FOR UNGROUNDED ELEMENTS

[75] Inventors: Robert C. Abbe, Newton; Noel S. Poduje, Needham Heights, both of Mass.

[73] Assignee: Ade Corporation, Watertown, Mass.

[22] Filed: Sept. 3, 1974

[21] Appl. No.: 502,874

[52] U.S. Cl. .............................. 324/61 R; 324/61 P
[51] Int. Cl.[2] ........................................ G01R 27/26
[58] Field of Search ......... 324/61 R, 61 QL, 61 QS, 324/61 P, 103 P; 307/235 A

[56] References Cited
UNITED STATES PATENTS

| | | | |
|---|---|---|---|
| 3,312,892 | 4/1967 | Parnes | 324/61 R |
| 3,418,597 | 12/1968 | Smith | 324/61 P |
| 3,523,246 | 8/1970 | Hall et al. | 324/61 R |
| 3,771,051 | 11/1973 | Abbe | 324/61 R |
| 3,775,679 | 11/1973 | Abbe | 324/61 R |
| 3,805,150 | 4/1974 | Abbe | 324/61 R |

*Primary Examiner*—John K. Corbin
*Assistant Examiner*—Wm. H. Punter
*Attorney, Agent, or Firm*—Weingarten, Maxham & Schurgin

[57] ABSTRACT

A system for capacitively gauging distance to an element which is not in a low impedance path to ground. The gauging system operates to provide an indication of distance with the potential on the element at a defined level, typically ground. Several embodiments are presented for making this measurement. A first operates to measure distance at periodic instances when the defined potential exists. A second embodiment uses phase opposite excitation to produce a defined potential at the element either by specific placement of the element or through a feedback control over element potential. The system of the present invention may be adapted for use in capacitive thickness measurement on an ungrounded or highly resistive element.

25 Claims, 9 Drawing Figures

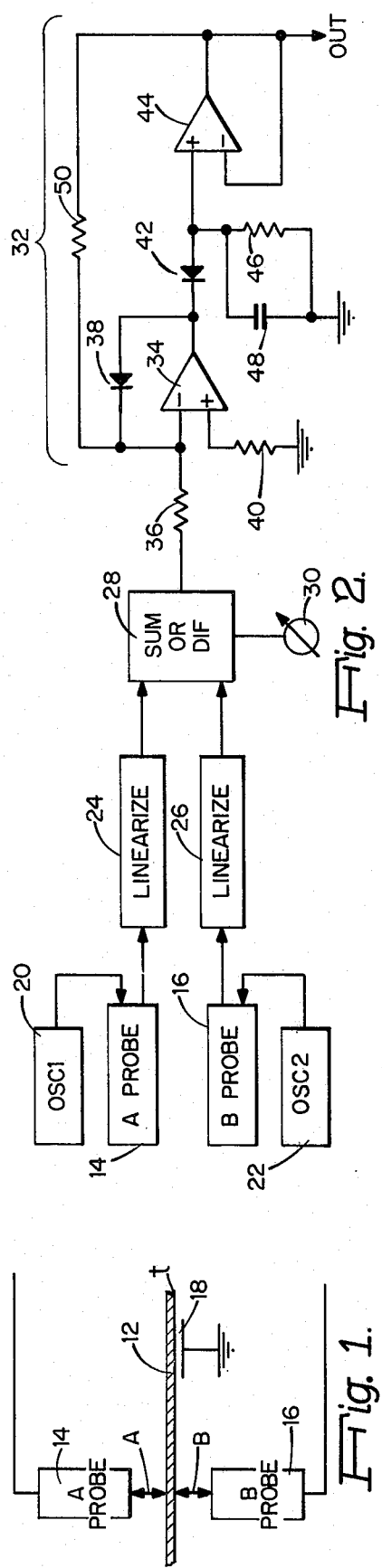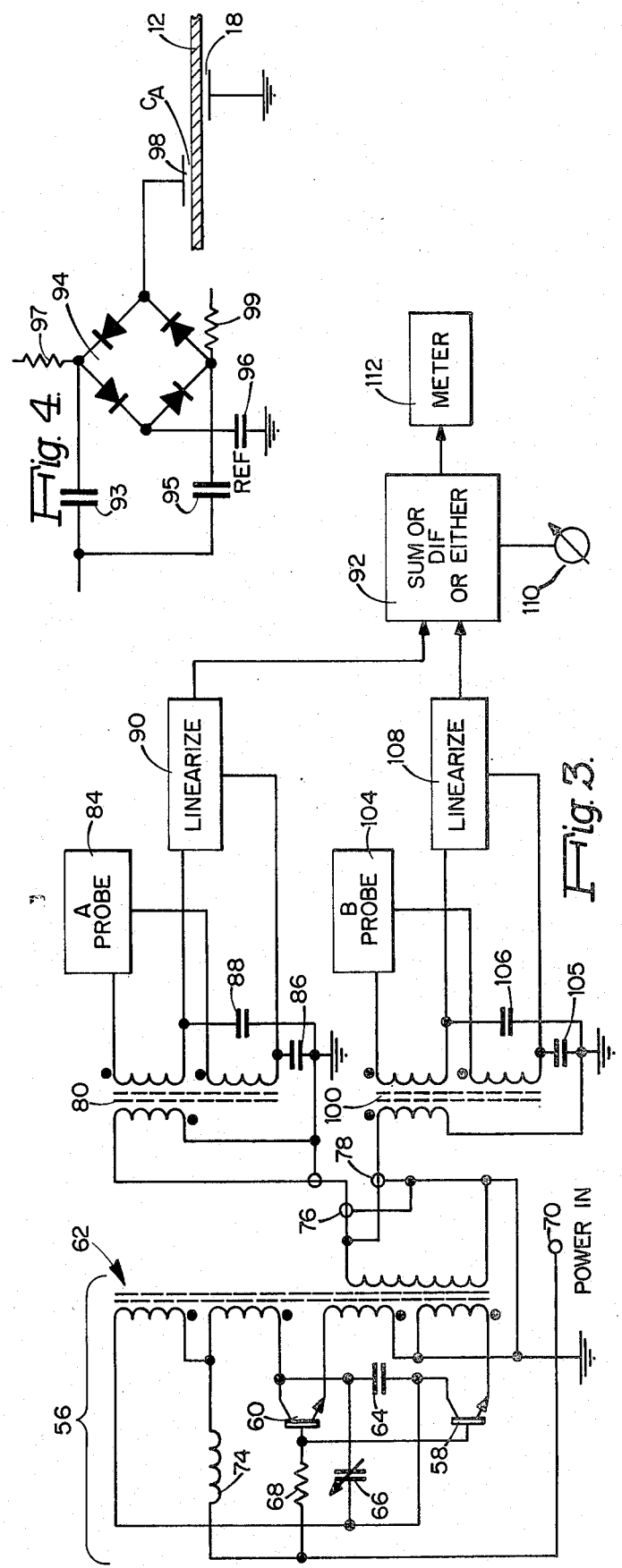

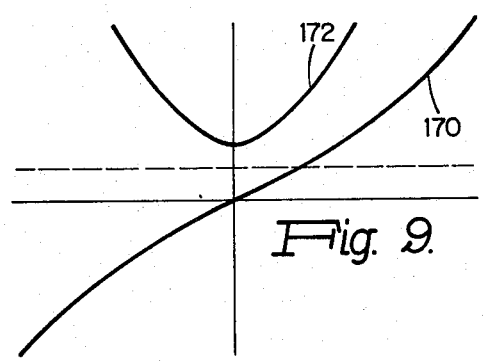
Fig. 5.
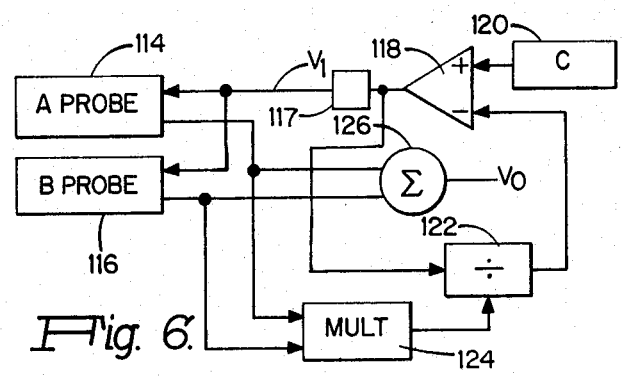
Fig. 6.
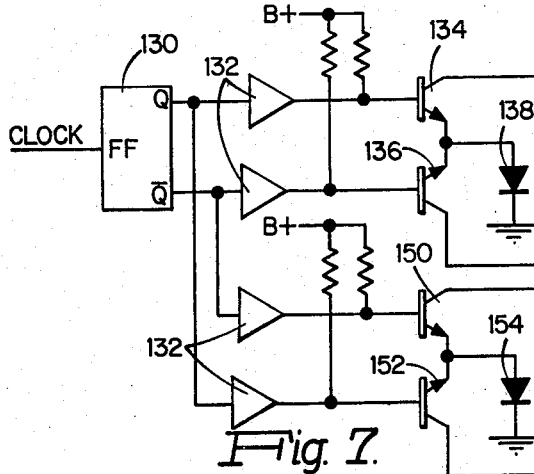
Fig. 9.
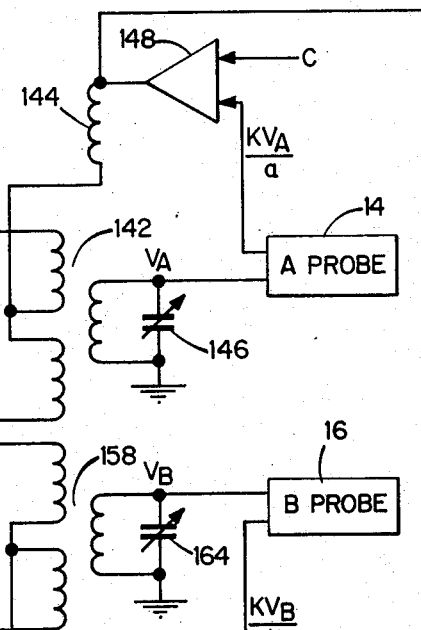
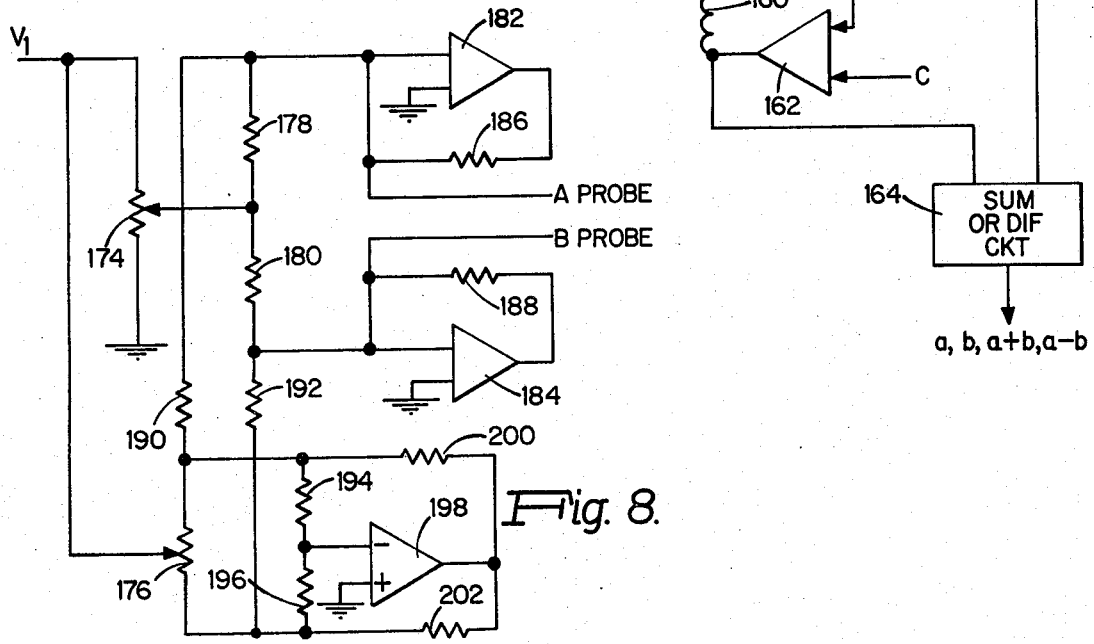
Fig. 7.
Fig. 8.

CAPACITIVE THICKNESS GAUGING FOR UNGROUNDED ELEMENTS

FIELD OF THE INVENTION

This invention relates to capacitive dimension gauging and in particular to a gauge for use in gauging the distance to an ungrounded or high impedance element.

BACKGROUND OF THE INVENTION

Classical capacitance proximity gauging techniques typically measure the capacitance to a grounded conductor. It may frequently occur, however, that there is a need to capacitively gauge the proximity of an element which presents an impedance to circuit ground, such as might be the case in gauging proximity to resistive semiconductor wafers or the proximity to a moving foil in a continuous process. In such instances, it becomes difficult or impossible to define the potential of the element because of inherent element impedance or difficulty in securely grounding the element being gauged.

Capacitive thickness gauging is a specific example where the need arises to gauge the proximity of elements whose potential is undefined. These typically operate upon the basis of two opposed proximity gauges whose output indications of distance are combined to provide an indication of the total distance which reflects the thickness of the element. Where the element is ungrounded or of significant impedance, however, its electrical potential will be a function of the currents applied to the element through the two capacitors from the respective proximity probes. This potential will vary with the placement of the element between the two probes and with changes in element impedance to ground and may thus create a substantial uncertainty both of absolute and relative thickness being gauged.

BRIEF SUMMARY OF THE INVENTION

In accordance with the present invention, a capacitive proximity gauging system is employed particularly to measure the thickness of an element which is connected to circuit ground or other defined potential by a high impedance. The invention is provided in generally first or second embodiments. The first embodiment provides for a varying element potential with the measurement of proximity, or thickness, at the moment when the voltage induced in the element is at a defined potential, generally ground. The second employs probe excitation circuitry which regulates the potential at the element to a predetermined potential, also typically ground.

In the first embodiment, using thickness as the exemplary dimension being gauged, first and second proximity probes are placed on opposite sides of an element and are excited at slightly different frequencies of AC excitation signal from two independent oscillators. As the voltage induced on the element from the probes passes through the zero voltage level, an output signal representing the summed probe output signals will pass through a positive peak which is detected.

In a second embodiment, also for thickness gauging, a single frequency of oscillation is employed but applied to the two probes in opposite phase. When the element being gauged is substantially centered between the probes, the voltage induced in it will be nearly zero. Variations from the centered condition will have a diminished effect on accuracy. A feedback circuit may additionally be employed to both linearize the output signal in terms of element thickness and to regulate the current supplied to the two proximity probes to insure a zero or otherwise well defined signal level on the element at all positions. Finally, an adjustment circuit is disclosed to reduce deviations of a generally first and second order nature in the output indication of element thickness with a single, independently acting control for each deviation.

BRIEF DESCRIPTION OF THE DRAWINGS

These and other features of the present invention are more fully described below in the detailed description of the preferred embodiment, presented for purposes of illustration and not by way of limitation, and in the accompanying drawings of which:

FIG. 1 is a diagram illustrating the concept of capacitive gauging of ungrounded elements;

FIG. 2 is a schematic diagram of a first embodiment for providing capacitive gauging of the thickness of ungrounded elements;

FIG. 3 is a circuit diagram of a second embodiment for providing capacitive thickness gauging of ungrounded elements;

FIG. 4 is a circuit diagram of a probe configuration for use in the thickness gauging circuitry;

FIG. 5 is a multiprobe schematic diagram illustrative of a further application for the FIG. 3 system;

FIG. 6 is a feedback linearization system for use with a two-probe capacitive thickness gauge in accordance with FIG. 3;

FIG. 7 is a schematic diagram of a feedback linearized capacitive thickness gauge;

FIG. 8 is a schematic diagram of an adjustment circuit for reducing deviations of generally first and second order nature in a capacitive thickness gauging system; and FIG. 9 is a graphical illustration of typical first and second order deviations in a capacitive thickness gauging system.

DETAILED DESCRIPTION OF THE PREFERRED EMBODIMENT

The present invention contemplates a multiprobe proximity gauging system for use in determining the proximity of an element which presents a significant impedance to ground or another defined potential. A specific example is in thickness gauging, but the invention is not limited in this regard.

As illustrated in FIG. 1, a foil 12 represents a work piece or element whose thickness, $t$, is to be gauged by first and second capacitive probes 14 and 16 placed on opposite sides of the foil 12. The probes 14 and 16 can measure the respective distances A and B from the probes to the element 12 capacitively and thereby determine the thickness, $t$, from the known separation of the probes 14 and 16.

Where, as shown in FIG. 1, the gauged element 12 is not electrically connected to ground but has a fixed or variable impedance, shown here as a capacitance 18, to ground, the electrical potential of the element 12 can vary from the zero voltage potential. In addition, element 12 may be a high impedance substance so that even if the element was grounded there would be a substantial potential variation on it. Since classical capacitive distance gauging techniques assume that the element to which proximity is being capacitively detected is at a fixed, well defined potential, the existence of a potential variation introduces an error and uncertainty. To visualize this more clearly, suppose, for example, the probes 14 and 16, as is typical, were excited by the same frequency of electrical oscillation for measuring the capacitance across the distances A and B. Because of the presence of the capacitance 18, the element 12 would act as an element of a capacitive voltage divider and its potential would fluctuate as a percentage (varying or fixed) of the electrical excitation signal applied by the probes 14 and 16. Assuming that the element 12 is of such a configuration that the capacitance 18 presented a high impedance, the voltage of element 12 would be a large percentage of the total applied voltage from the probes. The resulting reduction in voltage across the gaps of distances A and B would reduce as well the current from the probes 14 and 16, and the indicated distance would be accordingly greater, or the apparent thickness much less.

It is possible to represent the potential of the element 12 as a function of the excitation voltages, alternating electric potentials, applied to the probes 14 and 16. As a general case, it will be assumed that the probes 14 and 16 are not excited at the same frequency of alternating electrical signal but at slightly differing frequencies. As a result, the signal at the element 12 is represented by the voltage quantity $V_t$, as follows:

$$V_t = 2K_a \sin\omega t \cos\tfrac{1}{2}(\omega_a - \omega_b)t + (K_b - K_a)\sin\omega t$$

where $K_a$ and $K_b$ are constants which account for system losses, gains and initial signal levels, and where $\omega_a$ and $\omega_b$ are the frequencies of excitation for the probes. $\omega_a \simeq \omega_b \simeq \omega$.

Under the assumption that A≃B, which typically means the element is centered between the probes, the envelope for the waveform represented by the potential $V_t$ will pass through the zero signal level at a rate or frequency corresponding to the difference frequency between the two driving oscillations. It is proposed to employ this phenomenon to make a measurement of the distances A and B at exactly that moment, when the $V_t$ envelope is zero. A system for providing this function is illustrated in FIG. 2. As shown there, the first and second probes 14 and 16 are indicated as receiving electrical oscillation of first and second frequencies from respective oscillators 20 and 22. The probes 14 and 16 and the manner of exciting them in the preferred mode are shown in U.S. Pat. No. 3,805,150, specifically incorporated herein by reference. It is to be noted, however, that capacitive probes of other configurations may be employed as well. Typically, the output of the probes 14 and 16 is applied through corresponding linearizer circuits 24 and 26 which typically comprise diode break-point approximation circuits such as are known in the art and operate to compensate for the fact that in capacitive gauging the output signal varies inversely with distance. The outputs of the linearizers 24 and 26 are applied together to a sum or differencing circuit 28 which is controlled by a selector 30 to produce an output signal which represents either the sum or difference of the inputs. The voltage waveform of the output of the circuits 28 will typically be of the form shown in the above equation for $V_t$, except that in view of the fact that the output of circuit 28 represents a combination, sum or difference, depending upon which output polarity of each probe is selected, the condition of zero potential on the element 12 is realized at a maximum or positive peak envelope signal in the combined output. The output of the circuit 28 is applied to a peak detector 32 which selects the positive envelope peak of the signal from the circuit 28. At this point, the voltage $V_t$ will be at the zero envelope point and the reading or indication provided by the peak detector 32 will be a correct indication of the thickness of element 12 due to a virtual ground then existing at the element 12.

The peak detector 32 is shown to comprise a differential amplifier 34 having the output from the circuit 28 applied thereto on an inverting input through a resistor 36. A diode 38 is connected in the reverse direction from the inverting input of amplifier 34 to its output. The noninverting input of the amplifier 34 is grounded through a resistor 40. The output of the amplifier 34 is applied through a diode 42 in the reverse direction to the noninverting input of a further differential amplifier 44. This input also is passed to ground through a parallel combination of a resistor 46 and capacitor 48. The output of the amplifier 44 provides the output indication of thickness of element 12 and is also fed back to the noninverting input of the amplifier 44 and fed back through a resistor 50 to the noninverting input of the amplifier 34. The combination of resistor 46 and capacitor 48 provides a frequency adjustment for the peak detector 32 to permit peak decay at a rate sufficient to follow the variations in the dimension being gauged, but slow enough not to follow the envelope variations at the difference frequency $\tfrac{1}{2}(\omega_a - \omega_b)$. Typical frequencies for the oscillators 20 and 22 are in the range of 3 $MH_z$ and the typical frequency difference may be in the range of tens of $KH_z$.

A second embodiment for the present invention is shown in FIG. 3 wherein, instead of detecting the probe signals at the moment when the element potential is zero, circuitry is provided to apply signals to the respective probes 14 and 16 such that the potential at the element 12 is maintained at a defined potential, in this case at zero. For this purpose, a single oscillator circuit 56 is provided having transistors 58 and 60 connected with their bases together, and with their collectors connected through first and second coils of a transformer 62 to provide feedback to further transformer coils which are connected in series in the emitter circuits of transistors 58. The collectors are additionally connected together through parallel capacitors 64 and 66, capacitor 66 being a variable adjustment on the capacitance and accordingly frequency. A base biasing resistor 68 is connected to a power insert terminal 70. Similarly, the junction between the collector circuit coils of the transformer 62 is applied through a choke coil 74 to the terminal 70.

A secondary coil of transformer 62 is connected to ground on one end while the other end is taken as the oscillator output. This output is split into two lines which are conducted through cables 76 and 78 to the respective probe circuitry. The AC excitation through the cable 76 is applied to a primary coil of a transformer 80, the other end of the coil being connected to ground. The secondary of the transformer 80 has first and second coils, one side from each coil being applied to a probe 84 and the other sides being AC grounded through capacitors 86 and 88. The DC signals is passed through a linearizer 90 to a sum, difference or either signal selecting circuit 92 to be described below.

The probe 84 may be of the same design as indicated in the above referenced U.S. Pat. No. 3,805,150, employing transformer rather than capacitive coupling as is illustrated in FIG. 4. In such case, the signal from the transformer is applied directly into the probe 84 to a diode ring 94 and is there connected to opposite, diagonal junction points thereof. The other opposite diagonal function points of the bridge 94 are connected respectively to a reference capacitance 96 and to the proximity or distance measuring capacitance 98 ($C_A$) which includes the capacitance to the element 12 being gauged.

As shown in FIG. 4, the capacitive coupling of the above patent is equally feasible using capacitors 93 and 95 from one side of a single transformer (transformers are utilized to producee phase reversal between the probes) and by taking the output through impedances 97 and/or 99 from the diode ring 94.

The signal on cable 78 is similarly applied to a probe circuit through the primary coil of a transformer 100. The secondary of the transformer 100 comprises first and second coils, one end each of which being applied to a probe 104 for the capacitive proximity gauging of the distance B. The other end of the secondary coils are AC gounded through capacitors 105 and 106 with the DC signal across them applied through a linearizer 108 to the circuit 92. The circuit 92 is controlled by a selector 110 to apply to a meter 112 a signal representing the sum, difference or either of the signals from linearizers 90 and 108. A single line input to linearizers 90 and 108 may be obtained by shunting capacitors 86 and 105 as may be convenient for use in circuitry described below.

By reference to FIG. 3, it can be seen that the signals applied to the primaries of transformers 80 and 100 apply exactly 180° opposite phase signals to the probes 84 and 104 such that the voltage applied to the element 12 from the two probes will be essentially 180° out of phase. Accordingly, if the capacitance, $C_A$ and $C_B$, are made nearly the same, the voltage at the element 12 will stay close to zero. Although perturbations from this ideal condition may exist, they will normally be small and will produce a small resulting deviation in the output valve indicated in the meter 112. Accordingly, in the circuit techniques illustrated in FIG. 3, the potential at the element 12 is maintained at a nearly ground potential to prevent disruption in thickness accuracy.

With reference now to FIG. 5, there is a generalized multi probe gauging system shown to illustrate that the present invention can be utilized in any gauging technique, other than in strictly thickness gauging, in which two or more probes, particularly a balanced set of probes, may be employed for gauging an ungrounded or high impedance element. The technique may be utilized where it is desired to only produce a single probe indication. But through the use of an additional probe or more, the deviations resulting from undefined element potential can be largely or completely eliminated. The concept of the FIG. 3 circuitry for maintaining the element 12 being gauged at a generally zero potential has thus a greater utility.

A refinement upon the embodiment illustrated with respect to FIG. 3 employs a feedback technique to linearize the outputs of the probes. Such a feedback system is indicated with respect to FIG. 6. As shown there, first and second capacitive probe systems 114 and 116 are excited by an oscillator system 117 having an output potential of alternating electric current controlled by the output of an amplifier 118. Oscillator system 117 may correspond to the oscillator 56 of FIG. 3 with the output of the amplifier applied at the power input. Probe systems 114 and 116 would then correspond to the remaining circuitry of FIG. 3 from oscillator 56 to an including probes 84 and 104, but without linearizers or other circuitry beyond them.

The amplifier 118 receives on a noninverting input a constant DC potential from a source 120 and receives on an inverting input, the output of an analog division circuit 122. The division circuit 122 receives on a denominator input the signal from the amplifier 118 and on a numerator input the output of an analog multiplier 124 which receives respectively on its inputs the outputs of the probe systems 114 and 116. The thickness output may be taken from a summer 126 which sums the outputs of the probes 114 and 116. The feedback circuit of FIG. 6 operates to control the excitation voltage amplitude to the probe systems 114 and 116 such that the output of the division circuit 122, which is proportional to the product of the outputs from the two probes, is at a constant value. Under these circumstances, the output from the summer 126 will be directly proportional to the thickness being gauged as opposed to varying inversely with it as is typical with capacitive proximity gauging.

A further feedback embodiment may be employed using techniques illustrated in our U.S. Pat. No. 3,775,679. As shown in FIG. 7, a flip-flop 130 is clocked at a constant rate and provides a single frequency of alternating current excitation for the two probes. The opposite polarity outputs of the flip-flop 130 are applied through buffer amplifiers 132 into respective bases of transistors 134 and 136. The emitters of the transistors 134 and 136 are grounded through a diode 138 for biasing purposes while the collectors are connected together through a capacitor 140 in parallel with dual windings of a transformer 142. The center tap of those windings is the source of DC power for the transistors 134 and 136 through a choke coil 134. That DC level is controlled, as explained below, to provide amplitude control over the output of the transformer 142, through a secondary coil tuned by a capacitor 146, to the probe 14. The output of the probe 14 is applied to one input of a differential amplifier 148, the output having a constant amplitude signal such that the output will act as a control for the balanced modulation provided by the transistor 134 and 136 to maintain a constant current input to the probe 14.

Similarly, the opposite polarity outputs from the flip-flop 130 are applied through additional buffer amplifiers 132, in opposite polarity, to the bases of further balanced modulation transistors 150 and 152 which have their emitters biased through a diode 154 to ground. The collectors of the transistors 150 and 152 are connected together through the parallel combination of a tuning capacitor 156 and first and second primary coils of a transformer 158. The center point between the two primary coils of transformer 158 is provided with DC amplitude control for the balanced modulation through a choke coil 160 from the output of a differential amplifier 162 in order to control the amplitude provided to the secondary of transformer 158 and tuned by a capacitor 164 for application to the probe 16. The output of the probe 16 is applied to a first input of the differential amplifier 162 while a further input receives typically the same constant amplitude signal as applied to amplifier 148. The DC output signal applied through the transformer 158 to control the amplitude of the balanced modulation insures a constant current signal to the probe 16. If these same currents to the respective probes 14 and 16 are maintained equal and of opposite phase, it is then apparent that the voltage upon the element between them must be maintained at zero since there will be no current flowing through the capacitance between the element 12 and ground.

The outputs from the amplifiers 148 and 162 are applied to a sum, difference or either signal selection circuit 164 which, as indicated above, in response to a selection control provides an output representing the sum, difference or individual value of either of the input signals. This signal is linearized to directly represent the thickness, point-to-point variation in the signal or the proximity of each probe to the element 12 being gauged, depending upon the selection control.

With reference to FIGS. 8 and 9, there is illustrated a circuit arrangement for providing adjustments as may be desired for the FIGS. 3 circuitry to compensate for certain offsets of other general inaccuracies in the circuitry. Such inaccuracies may result as a combination of a generally first order deviation 170 and a generally second order deviation 172 as illustrated in FIG. 9. In FIG. 9 the vertical axis represents deviation and the horizontal axis represents position or system output signal. Typically, in a two-probe system such as illustrated in FIG. 3, the adjustment of these offsets in individual probe circuitry would be complex situation requiring simultaneous adjustment of several variable resistors in each circuit. The circuitry of FIG. 8 is designed to achieve this function by providing a first control 174 which adjusts the signal applied to both probes an equal amount in the same direction and by providing a further adjustment in a potentiometer 176 which varies a signal applied to each probe an equal but opposite amount. With relation to the FIG. 3 circuitry, the signal, such as the signal from the oscillator 56 as applied to the cables 76 and 78 is applied to the potentiometer 174, the wiper arm of which is applied through equal resistances 178 and 180 into inverting inputs of amplifiers 182 and 184. The amplifiers 182 and 184 have their outputs applied back to the inputs through negative feedback resistors 186 and 188. The correction for the respective probes 14 and 16 is taken from these inverting inputs and is typically summed with the probe outputs.

Also, the same signal which is applied to the potentiometer 174 is also applied to the wiper arm of the potentiometer 176. The other terminals of the potentiometer 176 are connected through equal resistors 190 and 192 to the inverting inputs of the amplifiers 182 and 184. These same terminals from the potentiometer 176 are connected through equal resistors 194 and 196 to an inverting input of an amplifier 198. The output of the amplifier 198 is also applied in parallel through equal resistors 200 and 202 to the junction between the resistors 194 and 196 and the potentiometer 176 terminals. The amplifier 198 and its circuitry will force the signals applied through the resistors 190 and 192 to be of opposite polarity and equal magnitude depending upon the setting of the wiper arm for the potentiometer 176. Additionally, the correction signals provided through the potentiometer 174 will be of equal amplitude and indentical polarity. The two together are combined in the respective amplifiers 182 and 184. In particular, the adjustment provided by the potentiometer 176 is effective to reduce the degree of deviation of a generally first order nature as illustrated in curve 170 while that provided by the potentiometer 174 is generally used to reduce the deviation of a second order nature illustrated in curve 172.

Having described above a preferred embodiment for the present invention and several alternatives, it will occur to those skilled in the art that modifications to disclose circuitry may be made within the spirit of the invention. It is accordingly intended to limit the scope of the invention only as indicated in the following claims.

What is claimed is:
1. A capacitive gauging system comprising:
   first probe means for applying excitation to a region of an element across a gap and for producing a first output signal representative of excitation applied to said element;
   second probe means for applying excitation to said region of said element across a gap and for producing a second output signal representative of excitation applied to said element;
   said element having a substantial impedance to said first and second probe means other than across said gaps;
   means for providing a predetermined element potential in the region of applied excitation from said first and second probe means at which the effect of said substantial impedance on at least one of said first and second output signals is generally minimalized.
   means responsive to said at least one of said first and second output signals for producing an output indication corresponding to proximity of said element to at least one of said first and second probe means under conditions of said predetermined element potential.
2. The capacitive gauging system of claim 1
   said means for providing a predetermined element potential includes:
      means for exciting said first probe means at a first frequency of alternating electrical signal.
      means for exciting said second probe means at a second frequency of alternating electrical signal, said first and second frequencies differing; and
   said means for producing an output indication includes:
      means for combining said first and second output signals to produce a resulting signal; and
      means for peak detecting said resulting signal.
3. The capacitive gauging system of claim 2 wherein:
   said first and second probe means are positioned on opposite sides of said element; and
   said combining means includes means for producing a summation of said first and second output signals whereby the peak detected resulting signal represents element thickness.
4. The capacitive gauging system of claim 3 wherein the element is substantially centered between said first and second probe means.
5. The capacitive gauging system of claim 2 wherein the difference frequency between said first and second frequencies is a small fraction of said first and second frequencies.
6. The capacitive gauging system of claim 1 wherein:
   at least one of said first and second probe means include a capacitive probe having a reference capacitive element and a distance representing capacitance measuring element and a diode ring with means for exciting the first and second capacitive elements through the diode ring.

7. The capacitive gauging system of claim 1 wherein the element includes a semiconductor wafer.

8. The capacitive gauging system of claim 1 wherein the element includes a moving strip.

9. The capacitive gauging system of claim 1 further including:
first and second means for linearizing said first and second output signals whereby said first and second output signals are made to vary directly with the gap between the element and the first and second probe means respectively.

10. The capacitive gauging system of claim 1 wherein said means for providing a predetermined element potential further includes:
means for applying alternating electrical signals to said first and second probe means to produce the excitations applied to said element thereby; and
means for adjusting the level of the first and second alternating electrical siignals in response to the first and second output signals thereby to provide the output indication directly representative of the proximity of the element.

11. The capacitive gauging system of claim 1 wherein:
the first and second probe means include first and second capacitive probes respectively measuring capacitance between themselves and the element;
said means for providing a predetermined element potential includes means for exciting the first and second capacitance probes with first and second alternating electrical signals of opposite polaity.

12. The capacitance gauging system of claim 11 wherein the element is positioned between said first and second capacitive probes approximately to provide equal capacitance between the element and the first and second probes.

13. The capacitive gauging system of claim 11 further including means operative in association with the exciting means for controlling the potential of the element to the predetermined level.

14. The capacitive gauging system of claim 13 wherein the predetermined level for the element is the ground potential.

15. The capacitive gauging system of claim 13 wherein the means for controlling the potential of the element includes means for regulating the current flowing through the capacitance between the first and second probes respectively and the element to produce generally equal currents of opposite phase.

16. The capacitive gauging system of claim 13 wherein:
said means for exciting the first and second probes includes a source of alternating electric potential of first and opposite polarities;
means are provided for amplitude modulating the alternating electric potentials of the first and opposite polarities in response to respective first and second controls;
means are provided for deriving the first and second controls in response to the first and second output signals produced by the first and second probes in order to maintain the first and second output signals generally at a predetermined constant signal level.

17. The capacitive gauging system of claim 11 further including:
means for adjusting the first and second alternating electrical signals in response to a control;
means for deriving the control as the difference between the constant level and the ratio of the control to the product of the first and second output signals.

18. The capacitive gauging system of claim 1 further including means for varying the excitation applied by both said first and second probe means in the same direction and means for varying the excitation by both said first and second probe means in the opposite direction.

19. A system for capacitively gauging proximity to an element wherein the element has a finite impedance to ground comprising:
a first probe positioned for detecting the capacitance between a region of the element and itself;
a second probe positioned for detecting the capacitance between the region of the element and itself;
means for exciting the first probe with an alternating electric signal at a first frequency;
means for exciting the second probe with an alternating electricl signal at a second frequency;
the first and second frequencies differing by a small percentage of either frequency whereby the voltage of said element is amplitude modulated at the frequency difference;
the first and second probes providing respective first and second output signals representative of the gap between the respective probes and the region of the element;
means for combining the first and second output signals to provide a composite output signal; and
means for detecting the value of the composite output signal when the voltage of the region of said element is at a defined potential in the amplitude modulation thereof which generally minimizes the effect of said finite impedance on said composite signal.

20. The capacitive gauging system of claim 19 wherein the defined potential is ground.

21. The capacitive gauging system of claim 20 including means for causing the detecting means to respond to proximity variations without responding at the difference frequency of the first or second frequencies.

22. The capacitive gauging system of claim 21 wherein the element is placed a generally equal distance from the first and second probes.

23. The system of claim 19 wherein the valve detecting means includes a peak detector circuit.

24. A multiprobe capacitive distance gauging system for gauging the distance to a generally ungrounded element, said system comprising:
a first probe positioned for detecting the capacitance between itself and a region of the element;
a second probe positioned for detecting the capacitance between itself and the region of the element;
the first and second probes being approximately positioned for equal capacitance to the element;
means for generating an alternating electric potential;
means for applying the alternating electric potential to the first probe in a first phase;
means for applying the alternating electrical potential to the second probe in an opposite phase whereby the potential of the element is maintained generally and approximately at the ground potential level at which the effect of impedance between the region of said element and the ground potential on capacitance detected by said first and second probes is generally minimized;

the first and second probes providing respective first and second output signals representative of the capacitance between the respective probes and the element means responsive to the first and second output signals for combining the first and second output signals; and means responsive to the combined signals for providing a representation of a dimension of said element.

25. A multiprobe capacitive distance gauging system for gauging the distance to a generally ungrounded element, said system comprising:

a first probe positioned for detecting the capacitance between itself and the element;

a second probe positioned for detecting the capacitance between itself and the element;

means for generating an alternating signal;

means for applying the alternating signal to the first probe in a first phase;

means for applying the alternating signal to the second probe in an opposite phase;

the first and second probes providing respective first and second output signals representative of the capacitance between the respective probes and the element;

means responsive to the first and second output signals for combining the first and second output signals;

means responsive to the combined signals for providing a representation of a dimension of said element;

means for generating a product signal representing the product of the first and second output signals;

means for generating the control signal representative of the difference between a constant and the ratio of the control signal and the product signal.

* * * * *

UNITED STATES PATENT AND TRADEMARK OFFICE
CERTIFICATE OF CORRECTION

PATENT NO. : 3,990,005
DATED : November 2, 1976
INVENTOR(S) : Robert C. Abbe and Noel S. Poduje It is certified that error appears in the above-identified patent and that said Letters Patent are hereby corrected as shown below:

Column 5, line 13, "single transformer" should read --single secondary transformer--; and
        line 14, "producee" should read --produce--.
Column 6, line 44, "the output" should read -- the other input--; and
        lines 67-68, "The DC output signal applied" should read --The resulting DC output applied--.

Signed and Sealed this

Nineteenth Day of April 1977

[SEAL]

Attest:

RUTH C. MASON
*Attesting Officer*

C. MARSHALL DANN
*Commissioner of Patents and Trademarks*